United States Patent
Artig

(10) Patent No.: US 10,327,582 B2
(45) Date of Patent: Jun. 25, 2019

(54) FOLDABLE FIREPLACE GRILL SYSTEM

(71) Applicant: Rory Artig, Stillwater, MN (US)

(72) Inventor: Rory Artig, Stillwater, MN (US)

(*) Notice: Subject to any disclaimer, the term of this patent is extended or adjusted under 35 U.S.C. 154(b) by 121 days.

(21) Appl. No.: 15/684,345

(22) Filed: Aug. 23, 2017

(65) Prior Publication Data

US 2018/0055280 A1 Mar. 1, 2018

Related U.S. Application Data

(60) Provisional application No. 62/379,147, filed on Aug. 24, 2016.

(51) Int. Cl.
| | | |
|---|---|---|
| *F24B 1/02* | (2006.01) | |
| *A47J 33/00* | (2006.01) | |
| *F24B 1/20* | (2006.01) | |
| *A47J 37/07* | (2006.01) | |

(52) U.S. Cl.
CPC .............. *A47J 33/00* (2013.01); *F24B 1/022* (2013.01); *F24B 1/205* (2013.01); *A47J 2037/0777* (2013.01)

(58) Field of Classification Search
CPC ................ F24B 1/02; F24B 3/00; A47J 33/00
USPC ......................... 126/9 B, 9 R, 29, 38; 99/400
See application file for complete search history.

(56) References Cited

U.S. PATENT DOCUMENTS

| | | | | |
|---|---|---|---|---|
| 1,626,035 A * | 4/1927 | Hans .......................... | F24C 1/16 | |
| | | | 126/38 | |
| 4,508,096 A * | 4/1985 | Slattery ..................... | F24C 1/16 | |
| | | | 126/26 | |
| 4,598,690 A * | 7/1986 | Hsu ........................... | F24C 1/16 | |
| | | | 126/25 R | |
| 4,621,608 A * | 11/1986 | Lee ...................... | A47J 37/0763 | |
| | | | 126/25 A | |
| 5,333,540 A * | 8/1994 | Mazzocchi .......... | A47J 37/0763 | |
| | | | 126/25 R | |
| D381,552 S * | 7/1997 | Pizzey .......................... | D7/332 | |
| 5,915,371 A | 6/1999 | Hering | | |
| 5,921,229 A | 7/1999 | Blake | | |
| 5,983,887 A | 11/1999 | Bourgeois | | |
| 6,182,560 B1 * | 2/2001 | Andress ............... | A47J 37/0718 | |
| | | | 126/25 R | |
| 6,439,111 B1 * | 8/2002 | Lu ........................ | A47J 37/0763 | |
| | | | 126/25 R | |
| 6,973,927 B1 * | 12/2005 | Stewart ................ | A47J 37/0786 | |
| | | | 126/201 | |
| 8,261,731 B2 | 9/2012 | Marsh | | |
| 8,752,539 B2 * | 6/2014 | Paap ..................... | A47J 37/0704 | |
| | | | 126/25 A | |

* cited by examiner

*Primary Examiner* — Gregory L Huson
*Assistant Examiner* — Nikhil P Mashruwala
(74) *Attorney, Agent, or Firm* — Jimenez Law Firm, Inc

(57) ABSTRACT

A collapsible and portable fireplace apparatus is described herein that includes a housing that is expanded and opens to create an open space for forming a fire, the housing being supported by a lightweight base wire frame assembly that also maintains the housing in an expanded state while in use. Once the base wire frame assembly is removed, the fireplace easily folds or collapses at a number of pivot points for ease of storage and transport along with the wire frame assembly. For improved operability a shelf grate is provided within the open space of the housing to support the fuel above a base panel to allow air to circulate under the burning fuel.

8 Claims, 9 Drawing Sheets

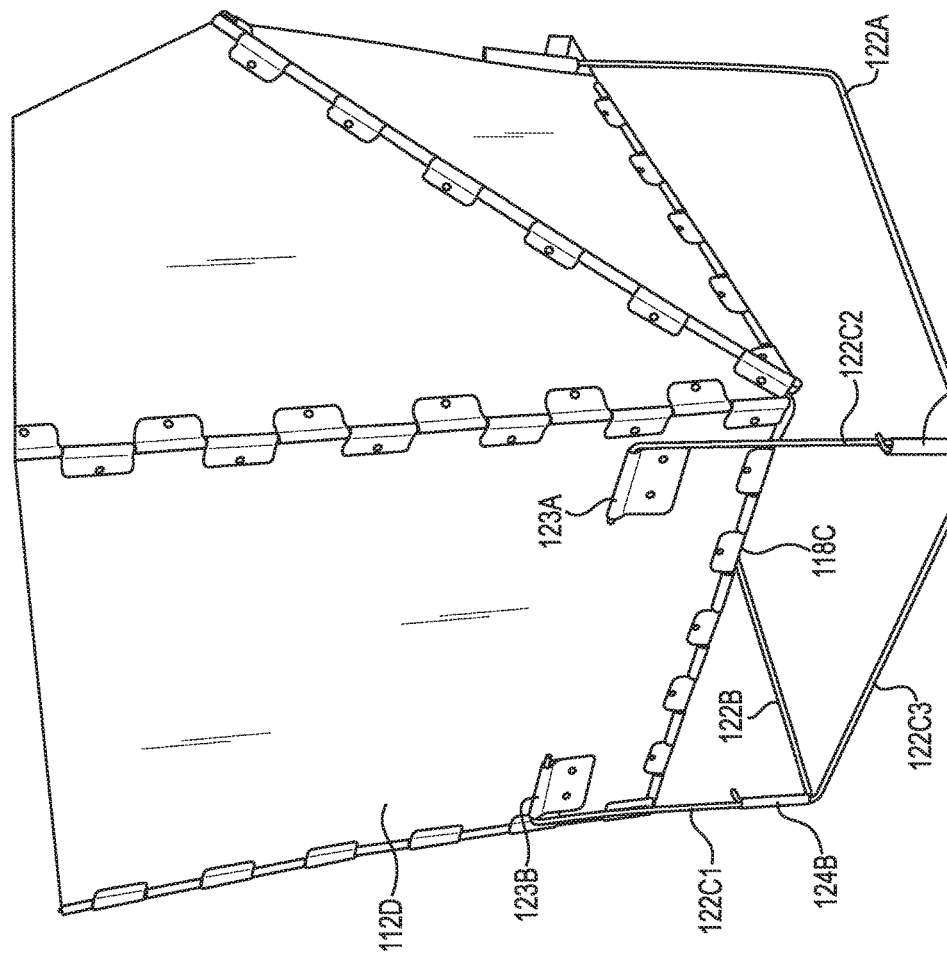

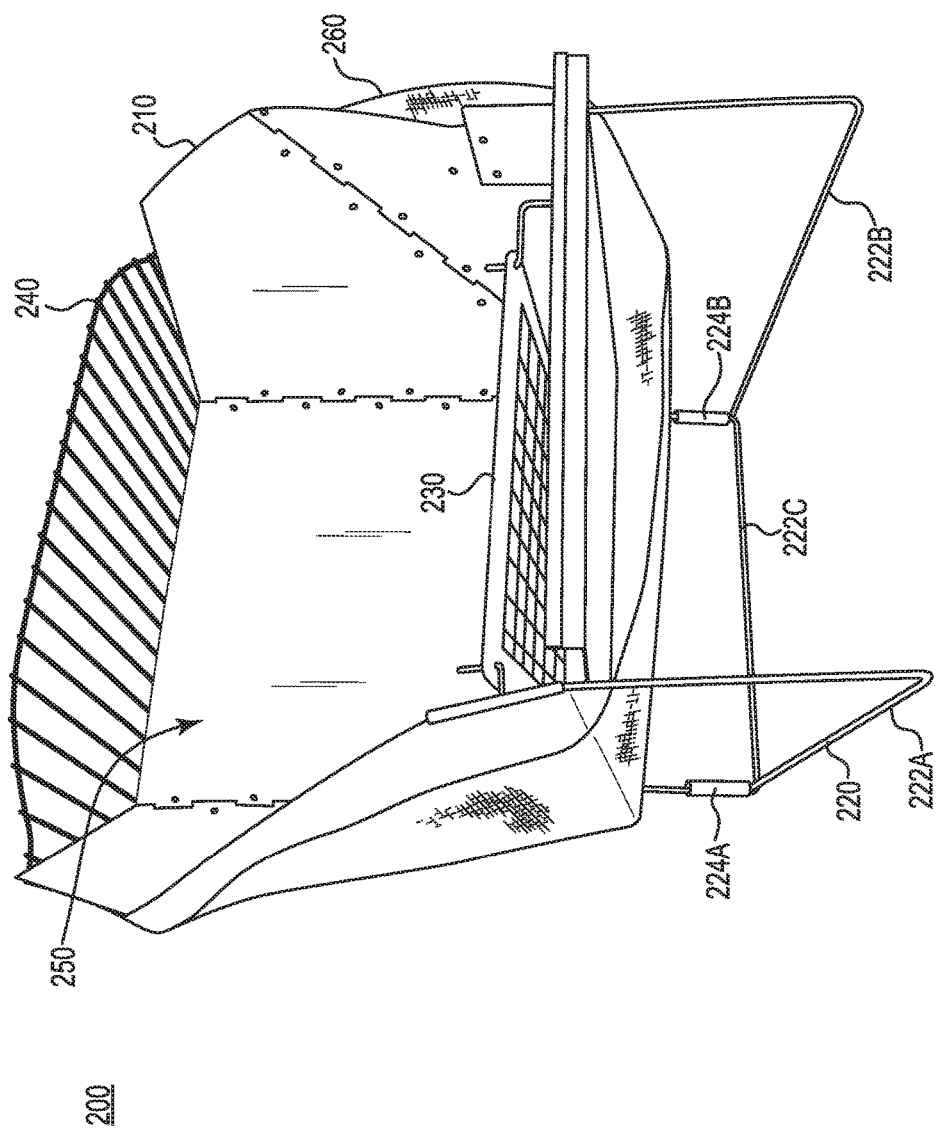

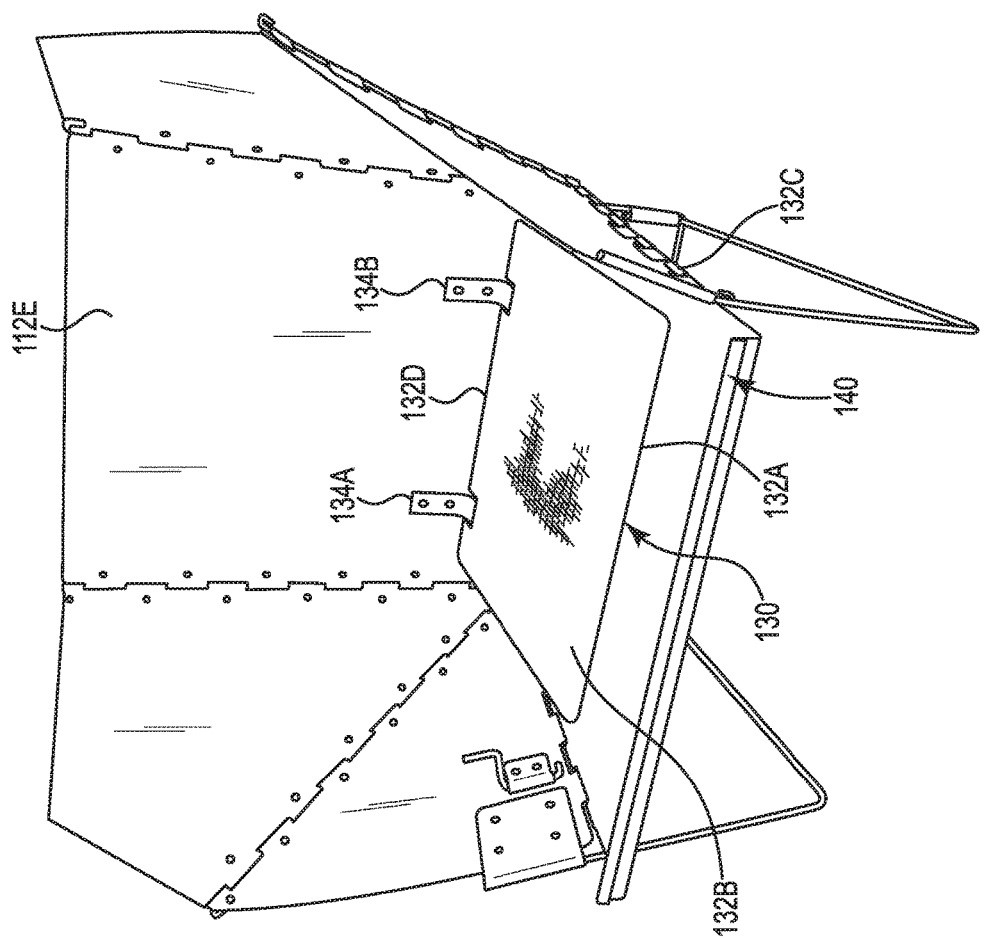

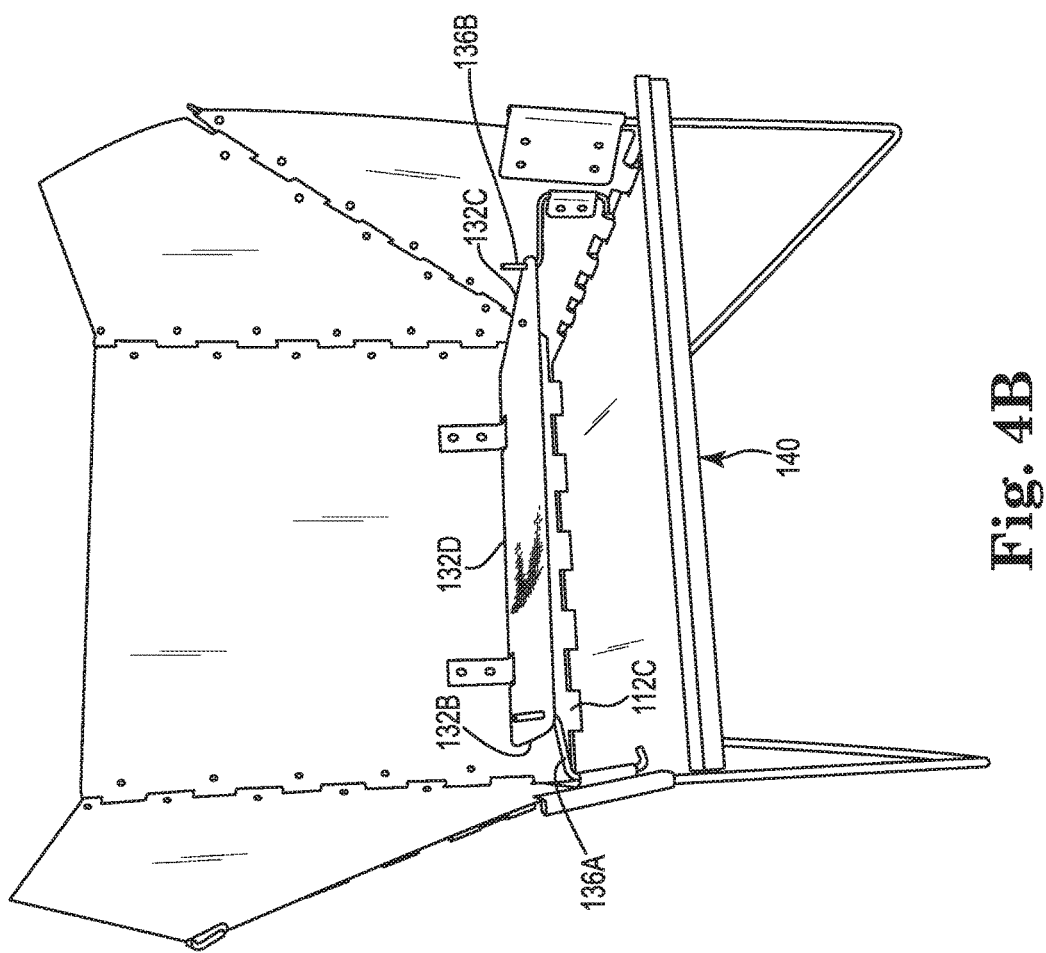

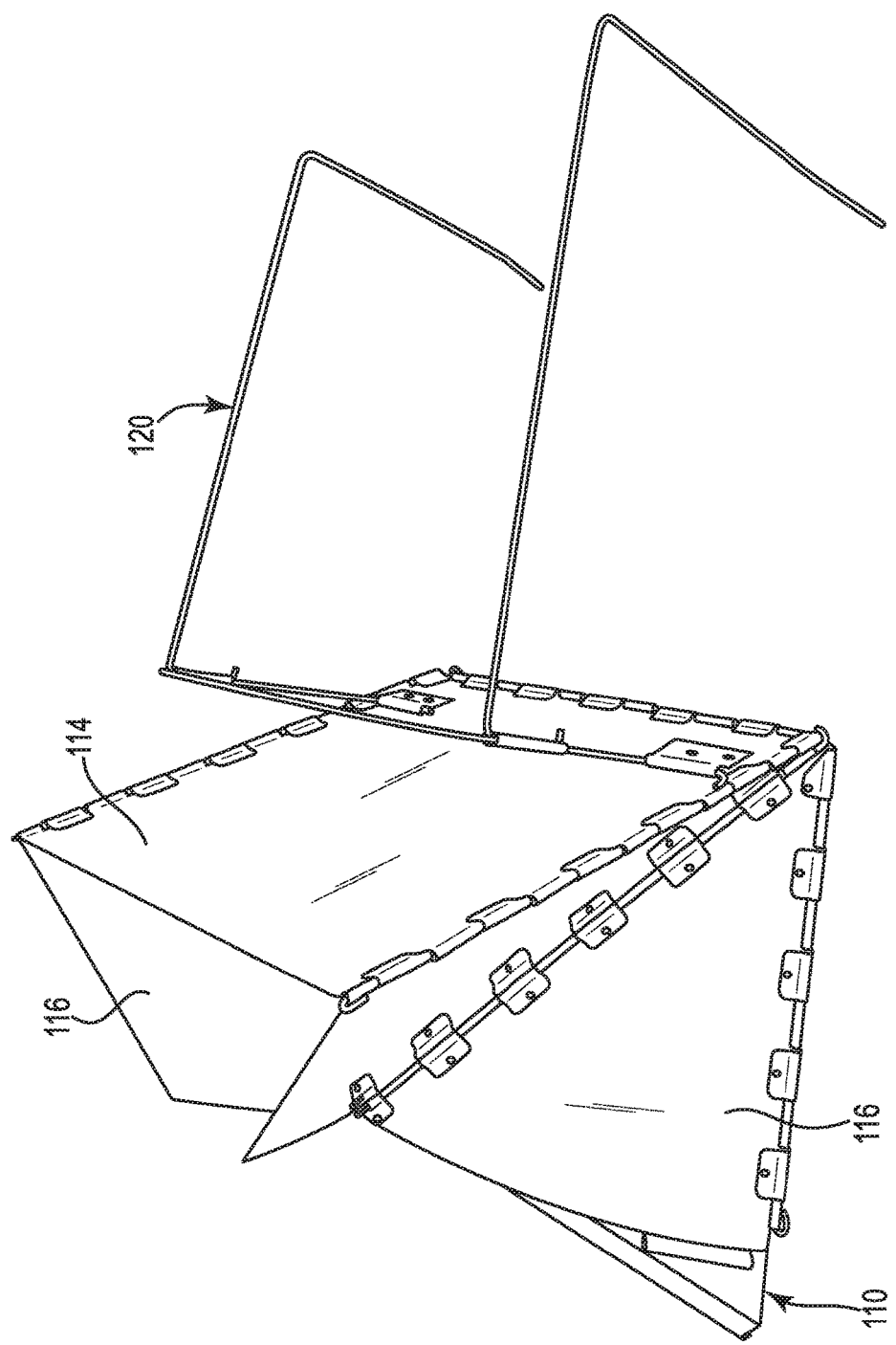

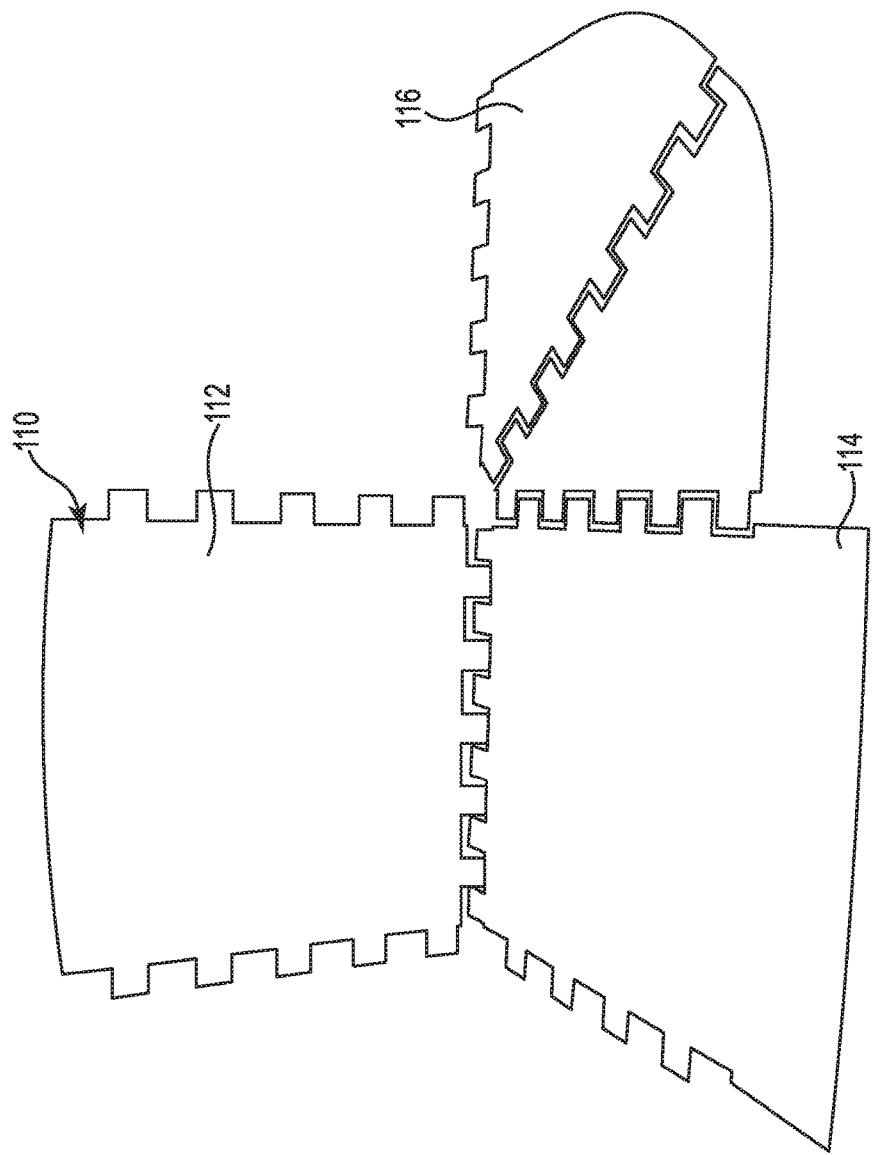

FOLDABLE FIREPLACE GRILL SYSTEM

CLAIM OF PRIORITY

This application claims priority to and the benefit of U.S. Provisional Patent Application No. 62/379,147, filed Aug. 24, 2016 and entitled "A FOLDABLE FIREPLACE GRILL SYSTEM" the application of which is incorporated herein by reference in its entirety.

FIELD AND BACKGROUND OF THE INVENTION

This invention generally relates to outdoor grills or stoves for camping and more particularly outdoor cooking devices that are collapsible for ease of portability.

Travelers to remote areas, such as for example, cross country skiers, hunters, campers and canoers frequently use an open fire to bake, roast, and grill their food. Special ovens termed reflector ovens are especially useful for baking and roasting food where an open fire is the heat source.

Previous campfire stoves or ovens have suffered from various problems such as a lack of consideration of the amount of storage space required to accommodate them when it is packed for travel; insufficient strength of construction to support the weight of food to be cooked; and lack of sufficient space for placing for cooking. Additionally, when the cooking or heating device is in use it must be sturdy, stable, and durable. The temperature reached in the cooking or heating device sometimes may also be difficult to direct to a user if they want to use it for personal heating while outdoors, such as when cross country skiing.

Another challenge to most stoves or grills is that the user needs to buy and carry fuel along on the trip. Additionally, bringing fuel such as propane or lighter fluid could contribute environmental costs associated with using them while camping. There is an unmet need for a superior alternative to cooking devices that use portable chemical fuels instead of using materials for fuel that are normally found near a campsite. It would also be advantageous to have a heating device that provides adjustable heat output, packs into a small space, is lightweight, simple to assemble and disassemble, and works well in cold weather.

SUMMARY

The various embodiments of this invention provide for a collapsible and portable fireplace (or cooking/apparatus) for solo or small groups of campers or cross-country skiers desiring to have a portable heater while in the woods that can also be used to cook or grill food. The various embodiments are easily carried in a backpack and can be configured in various sizes to accommodate the intended use. In one example embodiment of the fireplace apparatus described herein, a housing is expanded and opens to create an open space for building a fire or supporting a heat source (such as canned heat or a composite log), the housing being supported on the ground or flat surface by a lightweight base wire frame assembly and maintaining the housing in an expanded, open-face state while in use. Once the base wire frame assembly is removed, the fireplace easily folds or collapses at a number of pivot points for ease of storage and transport along with the wire frame assembly. For improved operability a shelf grate is provided within the open space of the housing to support the fuel above a housing base panel to allow air to circulate under the burning fuel. When fully assembled, the cooking/heating apparatus appears similar to a reflector oven.

To close or collapse the cooking/heating/fireplace apparatus, the latching wire first arm is rotated from the open, front of the fireplace towards the back of the fireplace apparatus and the side arms of the latching wire are disengaged each from their respective slots in the support panels. Pivoting the support panels about their respective frame wire arm, flattening them against the front of the fireplace, and folding the reflector panels and back panel one on top of the other, collapses the portable fireplace. In the various embodiments described herein, a heat resistant cover is disposed over the housing to protect the user from being injured and to prevent the start of any fire from the portable fireplace or heating apparatus. The heating apparatus or fireplace kit further includes a heat resistant cover or backpack that is disposable over the housing after collapsing the housing for portability.

In one example embodiment, there is provided a collapsible cooking or heating apparatus that includes a housing having an upright panel, a base panel and left and a right side panel members, the upright panel having a left side edge and a right side edge and a bottom edge and having the base panel connected to the bottom edge of the upright panel in a hinged configuration, the upright panel having the left side panel member connected to the left side edge of the upright panel and connected to a base panel left edge, the upright panel having the right side panel member connected to the right side edge of the upright panel and connected to a base panel right edge, wherein the housing forms an open space therein. The heating apparatus further includes a base wire frame assembly coupled to the housing and configured at least as a three-sided support of the housing such that the open space faces a user, the base wire frame assembly including two side frame members and a rear frame member, the rear frame member including at least two side legs and a bottom leg wherein the two side legs are spaced apart and coupled to a back surface of the upright panel and the bottom leg of the rear frame member rests on a surface. A distal end of each side frame member is coupled in a pivoting configuration with each side leg and wherein a proximal end of each side frame member is coupled to a front fastening member disposed on each of the right and left side panel members, wherein upon removing the base wire frame assembly, the right and left side panel members are directed inward towards the open space by the user to collapse the housing such that the two side panel members are enclosed between the upright panel and base panel and wherein the base wire frame assembly is collapsed and located adjacent one of the upright and base panels. In a related embodiment, there is included a shelf grate or grill located and supported within the open space of the housing above the base panel in a substantially parallel relationship with the base panel, the shelf grate having a shelf front edge, right and left shelf side edges, and a shelf back edge, the shelf back edge supported in a hinged configuration on a front surface of the upright panel, and the shelf front edge supported by pivoting pin assemblies extending from each side panel member.

In another example embodiment, there is provided collapsible cooking or heating apparatus including a housing having an upright panel, a base panel and left and a right side panel members, the upright panel having a left side edge and a right side edge and a bottom edge and having the base panel connected to the bottom edge of the upright panel in a hinged configuration, the upright panel having the left side panel member attachably connected to the left side edge of the upright panel and attachably connected to a base panel left edge, the upright panel having the right side panel member attachably connected to the right side edge of the upright panel and attachably connected to a base panel right edge, wherein the housing forms an open space therein. The apparatus further includes a shelf grate or grill located and supported within the open space of the housing above the base panel in a substantially parallel relationship with the base panel, the shelf grate having a shelf front edge, right and left shelf side edges, and a shelf back edge, the shelf back edge supported in a hinged configuration on a front surface of the upright panel, and the shelf front edge supported by at least one pin or support member in contact with the base panel.

In yet another example embodiment, there is provided a collapsible cooking or heating apparatus including a housing having an upright panel and a base panel and left and a right side support members, the upright panel having a left side edge and a right side edge and a bottom edge and having the base panel connected to the bottom edge of the upright panel in a hinged configuration, the upright panel having the left side support member attachably connected to the left side edge of the upright panel and attachably connected to a base panel left edge, the upright panel having the right side support member attachably connected to the right side edge of the upright panel and attachably connected to a base panel right edge, wherein the housing forms an open space therein. The apparatus further includes a shelf grate or grill located and supported within the open space of the housing above the base panel in a substantially parallel relationship with the base panel, the shelf grate having a shelf front edge, right and left shelf side edges, and a shelf back edge, the shelf back edge supported in a hinged configuration on a front surface of the upright panel, and the shelf front edge supported by at least one pin or support member in contact with the base panel. In this example embodiment, the attachably connected support members include rigid bars or pins adapted to support the housing and base panels in an L-shaped configuration.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DESCRIPTION OF THE DRAWINGS

FIG. 2 illustrates a rear perspective view of a collapsible fireplace or grill housing and a base wire frame assembly according to an example embodiment of the invention.

FIGS. 3A-3B illustrate front and rear perspective views of a collapsible fireplace or grill according to another example embodiment of the invention.

FIGS. 4A-4B illustrate front perspective views of an open space or face within a housing of the collapsible fireplace with a shelf grate in an unsupported and supported configuration, respectively.

FIGS. 5A-5B illustrate perspective views of a partially collapsed and fully collapsed fireplace, respectively, according to an example embodiment of the invention that includes a fabric heat shield.

FIG. 6 illustrates a flattened housing of a fully collapsed fireplace according to an example embodiment of the invention.

DETAILED DESCRIPTION OF THE INVENTION

The following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Figure 1:
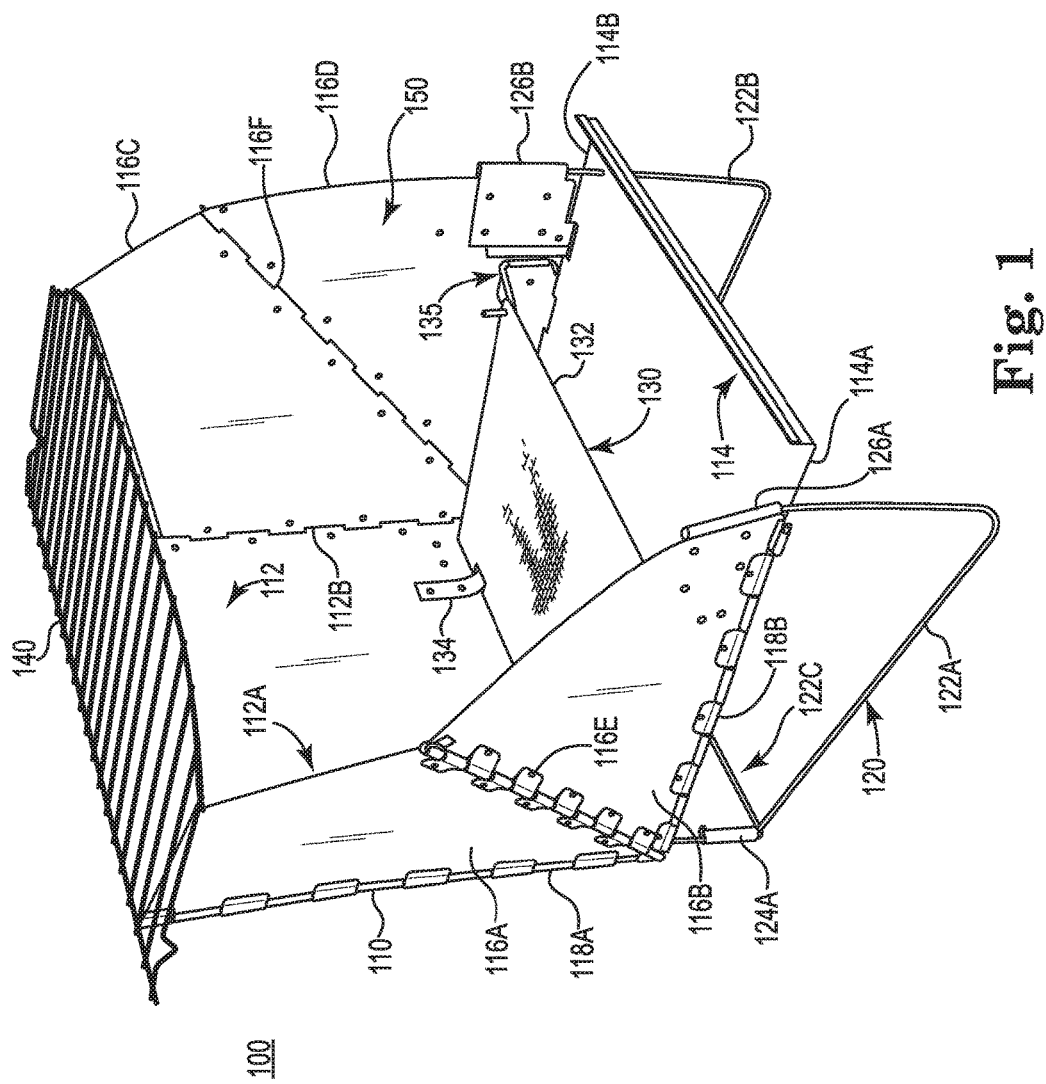
FIG. 1 illustrates a front perspective view of a collapsible fireplace or grill according to one example embodiment of the invention.

Referring now to the Figures, FIGS. 1 and 2 illustrate front and rear perspective views of a collapsible fireplace or grill apparatus 100 according to one example embodiment of the invention. Generally, fireplace apparatus 100 is formed from a housing 110 and a base wire frame assembly 120 coupled to the housing. Optionally, fireplace 100 includes a shelf grate 130 disposed within an open space of housing 110 and includes an upper grate 140 located at an upper portion of housing 110.

In this example embodiment, housing 110 has an upright panel 112, a base panel 114 and a left side panel member 116A/116B and a right side panel member 116C/116D. Upright panel 112 has a left side edge 112A and a right side edge 112B and a bottom edge 112C and has base panel 114 connected to bottom edge 112C of the upright panel in a hinged configuration 118C. Upright panel 112 has left side panel member 116A/116B connected to left side edge 112A of the upright panel at hinge 118A and connected to a base panel left edge 114A at a hinge 118B. Similarly, the upright panel having right side panel member 116C/116D connected to right side edge 112B of upright panel 112 at hinge 118C and connected to a base panel right edge 114B at hinge 118D, wherein the housing forms an open space 150 therein.

In this example embodiment, collapsible and portable fireplace 100 includes a base wire frame assembly 120 configured at least as a three-sided support of housing 110 such that open space or face 150 faces a user. Base wire frame assembly 120 includes two side frame members 122A and 122B and a rear frame member 122C, the rear frame member including at least two side legs 122C1 and 122C2 and a bottom leg 122C3. The two side legs of rear frame member 122C are spaced apart and coupled at hinges 123A and 123B to a back surface 112D of upright panel 112 and bottom leg 122C3 of rear frame member 122C rests on a surface. A distal end of each side frame member 122A and 122B is coupled in a pivoting configuration with sleeves or cuffs 124A and 124B with each side leg 122C1 and 122C2 and wherein a proximal end of each side frame member 122A and 122B is coupled to a front fastening member 126A and 126B disposed on each of right side panel member 116A/116B and left side panel member 116C/116D respectively. In this example embodiment, base frame assembly 120 not only supports housing 110 but also maintains side panel members 116 open so as to direct heat from a fire to the user during use.

Figure 5B:
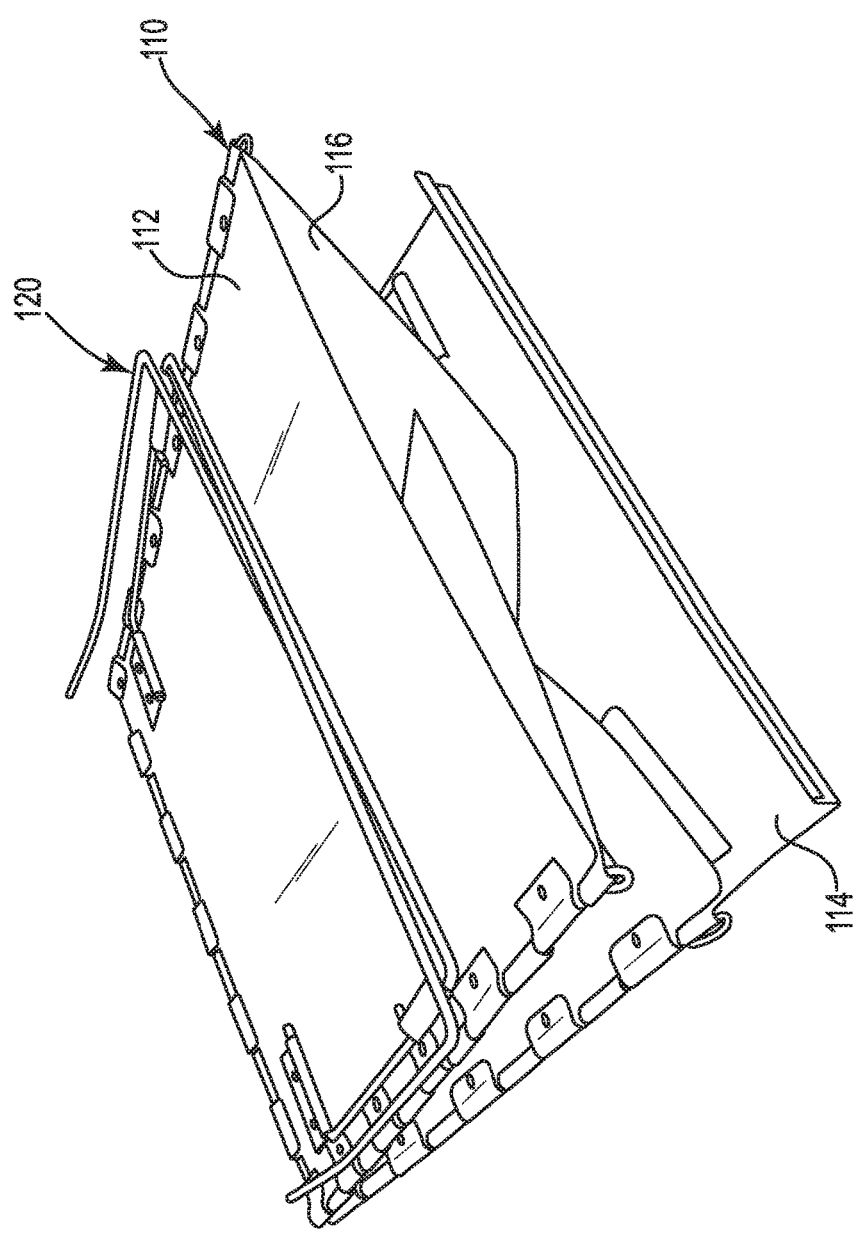

Referring now to FIGS. 5A-5B, there is illustrated perspective views of a partially collapsed and fully collapsed fireplace or cooking apparatus, respectively, according to an example embodiment of the invention. When a user wishes to collapse fireplace 100, upon removing base wire frame assembly 120 from housing 110 and fasteners 126, right 116A/116B and left side 116C/116D panel members are directed (or pushed) inward towards open space 150 by the user to collapse housing 110 such that the two side panel members 116 are enclosed between upright panel 112 and base panel 114. Base wire frame assembly 120 is collapsed and located adjacent one of upright 112 and base 114 panels. To simplify collapsibility, in one example embodiment, right and left side panel members (116A/116B and 116C/116D) are hingeably connected to upright panel 112, respectively, at left side edge 112A and right side edge 112B. In this example embodiment, right and left side panel members are further comprised of two portions 116A and 116B (left) and 116C and 116D (right) that are hingeably connected at hinges 116E and 116F, wherein the hinge between each panel member folds towards open space 150 of housing 110. FIG. 6 illustrates a flattened housing of a fully collapsed fireplace housing 110 or 210 according to example embodiments of the invention.

In various embodiments, the hinge configuration described and illustrated herein is a pivot point between panel that comprises a sleeve or hinge and a central core such as a wire about which the sleeve or hinge rotates. The wire may be totally enclosed or partially enclosed (see for example FIGS. 2 and 4A-4B). When a panel edge is curled or rolled back upon itself, it is termed a sleeve. When a panel edge has a toothed pattern and the teeth-like extensions of one panel are curled and are align with those of another panel to encircle the wire, it is termed a hinge (see for example FIGS. 4A-4B). Alternatively, a bracket mount can be used to support a wire and form a pivot point. Preferably, the edges of each of the various panels are substantially at right angles one to the other and have sleeves through which a single wire is passed, thus providing a frame, such as for housing 110. The sleeves permit the panels to rotate or pivot about the wire frame.

In a related example embodiment, FIGS. 4A-4B illustrate front perspective views of an open space within a housing of the collapsible fireplace with a shelf grate in an unsupported and supported configuration, respectively. In this embodiment, fireplace 100 further includes a shelf grate 130 configured to be supported within open space 150 of housing 110 above the base panel in a substantially parallel relationship with the base panel. Shelf grate 130 can be used for stacking twigs and wood or briquettes which is the source of the fire and subsequent heat. The space or gap between shelf grate 130 and base panel 140 allows air to circulate under the burning fuel while shelf grate 130 allows ashes to fall through to base panel 140. Shelf grate 130 has a shelf front edge 132A, left shelf side edge 132B and right shelf side edge 132C, and a shelf back edge 132D. Shelf back edge 132D is supported in a hinged configuration 134A and 134B on a front surface 112E of upright panel 112, and shelf front edge 132A is further supported by pivoting pin assemblies 136A and 136B extending from each side panel member 116.

Figure 3B:
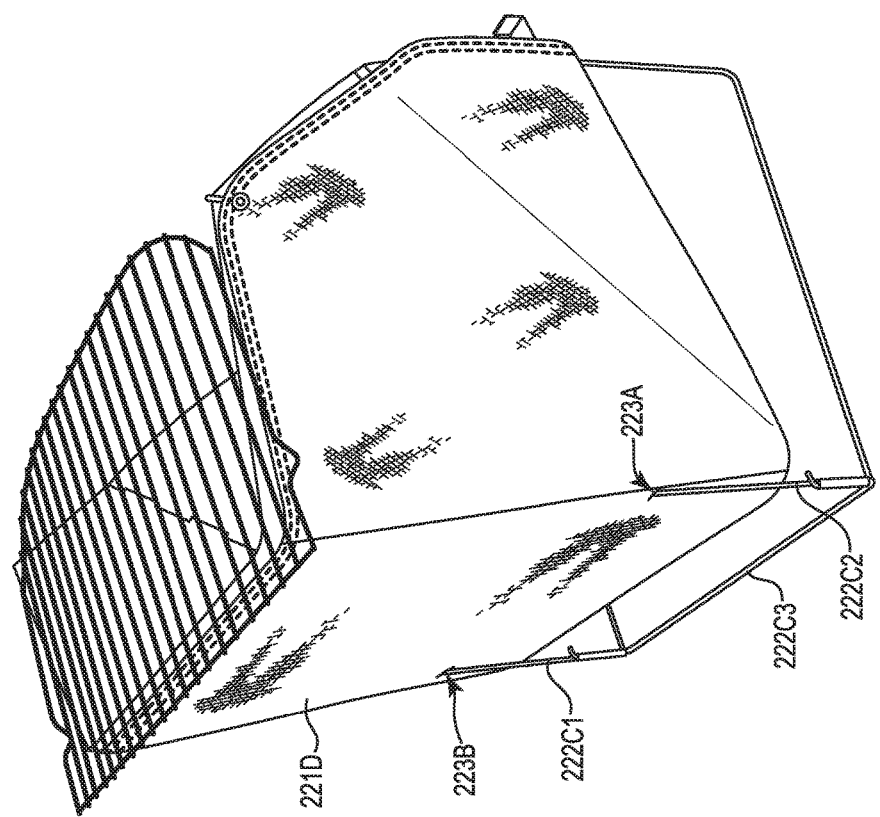

FIGS. 3A-3B illustrate front and a rear perspective views of a collapsible fireplace or grill 200 according to another example embodiment of the invention. In this example embodiment, fireplace 200 includes a housing 210, a base wire frame assembly 220, a shelf grate 230, a grill 240, an open space 250 formed by housing 210 and further includes a fire-resistant heat shield cover 260, made of high temperature fire-resistant fabric or any other fire-resistant material to reduce the chance of scorching the ground beneath the fireplace and to increase the heat directed towards the users. In this example embodiment, base wire frame assembly 220 has a portion of the rear frame member 222C inserted into a rear portion of upright panel 212. The two side legs 222C1 and 222C2 of rear frame member 222C are spaced apart and coupled at apertures 223A and 223B to a back surface 212D of upright panel 212 and bottom leg 222C3 of rear frame member 222C rests on a surface.

In another related example embodiment, construction is simplified by having housing 110 include upright panel 112 attached to base panel 114 and having attachable left side panel members 116A/116B and right side panel members 116C/116D. In another related embodiment, unattached (and attachable) left and right side panels 116 are smaller and are formed from a single piece to simplify construction, reduce weight and simplify assembly and disassembly. In yet another example embodiment, housing 110 only includes upright panel 112 attached at one edge to base panel 114 (to form an L-shaped open housing), with upright panel 112 and base panel 114 held in an L-shaped configuration by side arms or links or cables attached to each panel. In all of these example embodiments, housing 110 still forms an open space 150 therein. Base wire frame assembly 120 is configurable to support any of the aforementioned embodiments of housing 110.

In this and various example embodiments, the various components are made from heat resistant materials such as metal or ceramic. In another related embodiment, some or all of the housing panels are not solid panels and are formed from open/grate panels to reduce weight and facilitate construction and collapsibility.

The following patents and publications are incorporated by reference in their entireties: U.S. Pat. Nos. 5,915,371; 5,921,229; 5,983,887; and 8,261,731.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A collapsible cooking or heating apparatus comprising:
a housing having an upright panel, a base panel and left and a right side panel members, the upright panel having a left side edge and a right side edge and a bottom edge and having the base panel connected to the bottom edge of the upright panel in a hinged configuration, the upright panel having the left side panel member connected to the left side edge of the upright panel and connected to a base panel left edge, the upright panel having the right side panel member connected to the right side edge of the upright panel and connected to a base panel right edge, wherein the housing forms an open space therein;
a shelf grate or grill configured to be supported within the open space of the housing above the base panel in a substantially parallel relationship with the base panel, the shelf grate having a shelf front edge, right and left shelf side edges, and a shelf back edge, the shelf back edge supported in a hinged configuration on a front surface of the upright panel, and the shelf front edge supported by pivoting pin assemblies extending from each side panel member; and a base wire frame assembly configured at least as a three-sided support of the housing such that the open space faces a user, the base wire frame assembly including two side frame members and a rear frame member, the rear frame member including at least two side legs and a bottom leg wherein the two side legs are spaced apart and coupled to a back surface of the upright panel and the bottom leg of the rear frame member rests on a surface, wherein a distal end of each side frame member is coupled in a pivoting configuration with each side leg and wherein a proximal end of each side frame member is coupled to a front fastening member disposed on each of the right and left side panel members, wherein upon removing the base wire frame assembly, the right and left side panel members are directed inward towards the open space by the user to collapse the housing such that the two side panel members are enclosed between the upright panel and base panel and wherein the base wire frame assembly is collapsed and located adjacent one of the upright and base panels.

2. The collapsible apparatus of claim 1, wherein the right and left side panel members are comprised of two portions that are hingeably connected, wherein a hinge between each panel member folds towards the open space of the housing.

3. The collapsible apparatus of claim 1 wherein the right and left side panel members are hingeably connected to the upright panel respectively at the left side edge and the right side edge.

4. The collapsible apparatus of claim 1, wherein the rear frame member of the base wire frame assembly is substantially u-shaped.

5. The collapsible apparatus of claim 1 further comprising an upper grate or grill adapted to be located at a top portion of the housing and supported by the left and right side panel members.

6. The collapsible apparatus of claim 1 further comprising a heat resistant cover adapted to be disposed over the housing during use.

7. The collapsible apparatus of claim 1 further comprising a heat resistant cover adapted to be disposed over the housing after collapsing the housing for portability.

8. The collapsible apparatus of claim 1 further comprising a heat resistant backpack adapted to be disposed over the housing after collapsing the housing for portability.

* * * * *